No. 611,593. Patented Sept. 27, 1898.
I. MacDONALD.
MEANS FOR CLOSING SHOT HOLES IN WAR SHIPS.
(Application filed Aug. 23, 1897.)
(No Model.)
Fig. I.
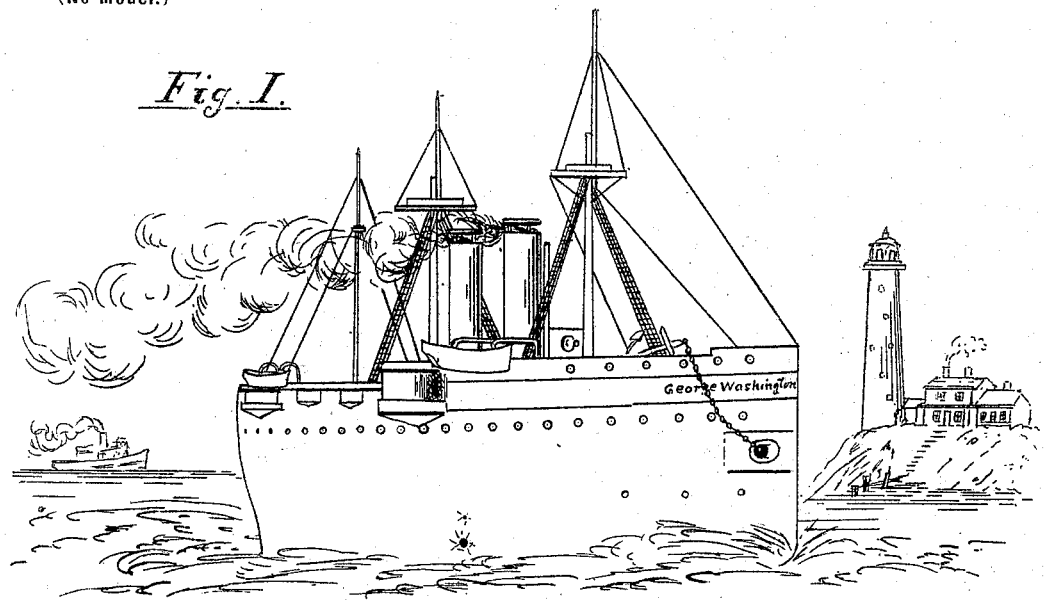
Fig. II.
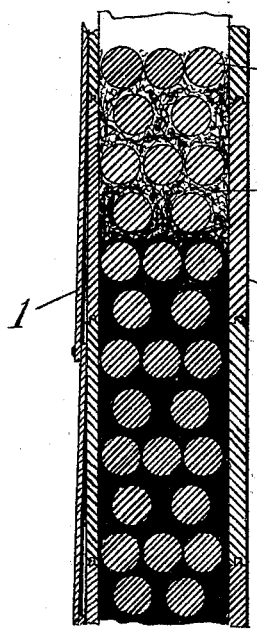
Fig. III.
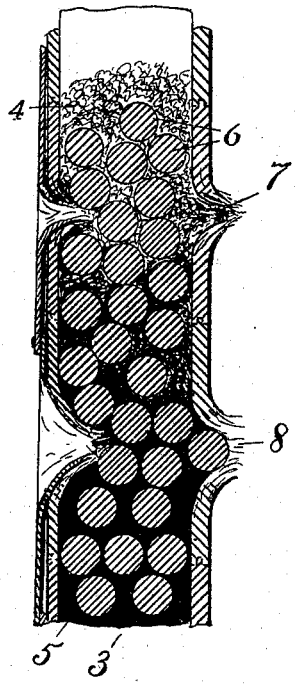
Fig. IV.
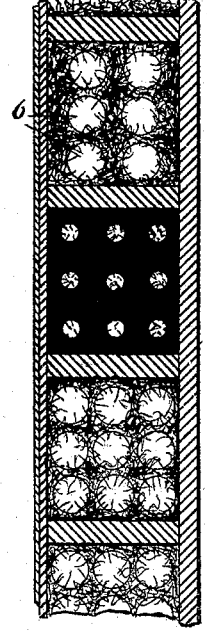
Witnesses
K Lockwood Nevius
Adam Hoch
Inventor.
Isaiah MacDonald
By Francis M. Wright, Atty No. 611,593. Patented Sept. 27, 1898.
I. MacDONALD.
MEANS FOR CLOSING SHOT HOLES IN WAR SHIPS.
(Application filed Aug. 23, 1897.)
(No Model.)
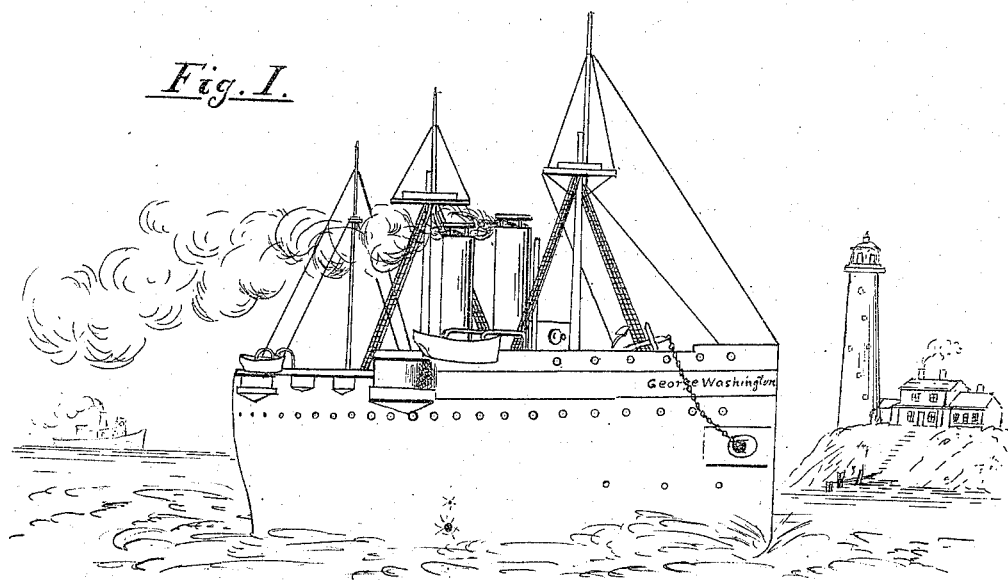
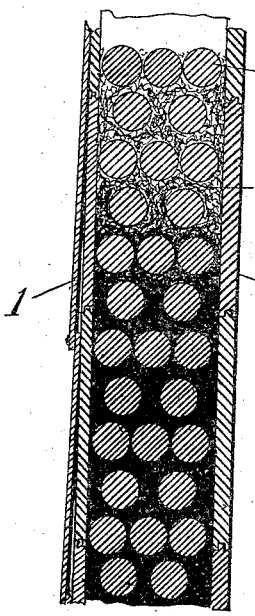
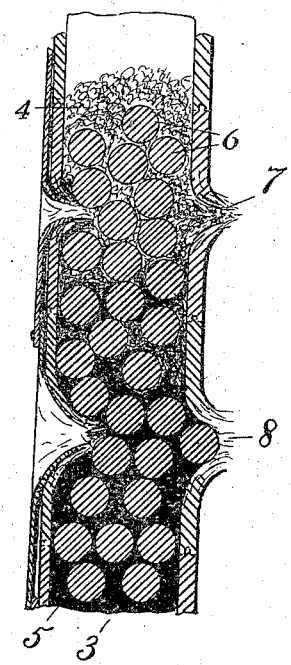
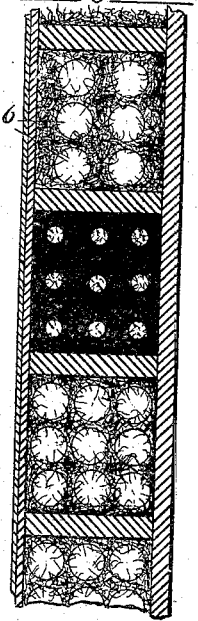
Witnesses
K Lockwood Nevius
Adam Hoch
Inventor.
Isaiah MacDonald
By Francis M. Wright, Atty.

United States Patent Office.

ISAIAH MacDONALD, OF SAN FRANCISCO, CALIFORNIA.

MEANS FOR CLOSING SHOT-HOLES IN WAR-SHIPS.

SPECIFICATION forming part of Letters Patent No. 611,593, dated September 27, 1898.

Application filed August 23, 1897. Serial No. 649,268. (No model.)

*To all whom it may concern:*

Be it known that I, ISAIAH MACDONALD, a citizen of the United States, residing at San Francisco, in the county of San Francisco and State of California, have invented certain new and useful Improvements in the Hulls of War-Ships, of which the following is a specification.

The object of my invention has been to provide a stuffing for the sides of ships, to be interposed between the inner casing of the side and the outer plates thereof, which shall automatically close any shot-holes made therethrough and render the same water-tight.

In the accompanying drawings, Figure 1 is a perspective view of a war-ship protected with my improved stuffing. Fig. 2 is a vertical transverse section of a side of the ship. Fig. 3 shows the same as it appears after being pierced by shot, and Fig. 4 is a horizontal section of the side.

1 represents the outer plates of the ship, 2 the inner casing, and 3 the stuffing. Said stuffing comprises a mixture of loose fibrous material 4, as hemp, with tar 5 and a number of wooden balls 6 interspersed in the hemp at substantially uniform distances from each other.

In making use of my invention the space between the inner casing and the outer plates is first filled as far as practicable with the hemp fiber, unspun or loose, the balls being at the same time laid regularly therein, and then the tar, heated to a freely-fluid condition, is poured into the space. The tar will fill up the remainder of the space not occupied by the hemp and balls. When the tar is cooled to its normal temperature, it will assume a viscous condition suitable for the purpose described. If now the outside of the vessel is pierced by a shot, the hemp and tar will immediately begin to flow into the aperture so made along with the water and will fill the same before a considerable quantity of water has passed therethrough, as shown at 7 in Fig. 3.

The balls will be made sufficiently large to stop holes made by shot of the class of war-vessels which the vessel using the invention would contend against, and the manner in which the balls assist in stopping the holes made by the shot is illustrated at 8 in Fig. 3, where it is seen that the ball is partly forced into the hole and with the hemp and tar renders the same water-tight.

The oil-tar which I prefer to use is that obtained from the oil-wells at Los Angeles and elsewhere in the State of California. It somewhat resembles coal-tar, flows freely when hot, but when used in the manner described and reduced to normal temperature remains viscous for any length of time.

I claim—

1. A ship having its sides provided with inner and outer walls, and a stuffing therebetween of loose unspun fibrous material and a sufficient proportion of tar intermingled therewith to flow when the side of the ship is pierced and to carry the fibrous material into the hole to close the same, the inner and outer walls being spaced sufficiently apart to permit the tar and fibrous material carried thereby to flow between said walls, substantially as described.

2. A stuffing for the sides of ships, consisting of loose fibrous material, tar, and balls of wood or the like material, substantially as specified.

ISAIAH MACDONALD.

Witnesses:
T. S. O'BRIEN,
DAVID WELLS.